United States Patent

Bouchara

[11] 3,901,889
[45] Aug. 26, 1975

[54] 1,2-BIS-(4-PHENYL-1-PIPERAZINYL)-ETHANES

[76] Inventor: Emile Bouchara, 75 bis, Ave. Foch, 75 Paris, France

[22] Filed: May 29, 1973

[21] Appl. No.: 364,328

[30] Foreign Application Priority Data
June 2, 1972  France .............................. 72.19903

[52] U.S. Cl. ...... 260/268 PH; 260/268 BI; 424/250
[51] Int. Cl.² .................................... C07D 295/06
[58] Field of Search ................ 260/268 BI, 268 PH

[56] References Cited
UNITED STATES PATENTS

| | | | |
|---|---|---|---|
| 3,558,266 | 1/1971 | Klecmann et al. ............ | 260/268 BI |
| 3,655,668 | 4/1972 | McCarty ....................... | 260/268 BI |

Primary Examiner—Donald G. Daus
Assistant Examiner—Jose Tovar
Attorney, Agent, or Firm—Young & Thompson

[57] ABSTRACT

This invention relates to therapeutically useful 1,2-bis-(4-phenyl-1-piperazinyl)-ethane derivatives having the formula:

in which $R_1$ and $R_2$ represent independently from each other a radical selected from the halogens, the trifluoromethyl radical and the lower alkyl radicals.

7 Claims, No Drawings

1,2-BIS-(4-PHENYL-1-PIPERAZINYL)-ETHANES

This invention relates to 1,2-bis-(4-phenyl-1-piperazinyl)-ethane derivatives.

This invention provides new 1,2-bis-(4-phenyl-1-piperazinyl)-ethane derivatives having the formula:

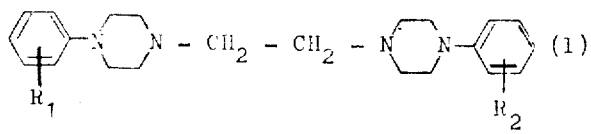

in which $R_1$ and $R_2$ represent independently from each other a halogen, a trifluoromethyl radical or a lower alkyl radical, and their acid addition salts.

In the above definition, the term "lower alkyl radical" is intended to refer to straight- or branched-chain radicals having 1–6 carbon atoms. Said radicals contain preferably 1–4 carbon atoms.

In addition, the preferred halogen is chlorine and the most preferred halogen is fluorine.

The compounds of this invention may be prepared by refluxing a mixture of a piperazine having the formula:

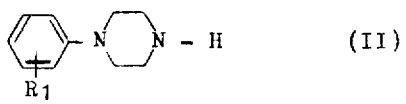

in which $R_1$ has the above-defined meaning, and of a halogen derivative having the formula

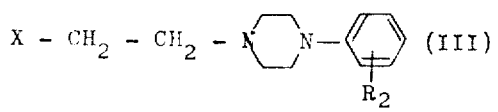

in which $R_2$ has the above-defined meaning and X is halogen, typically chlorine, or, in the case of the production of compounds in which $R_1$ and $R_2$ are the same, of a halogen derivative having the formula:

$$X' - CH_2 - CH_2 - X'$$

in which X' is halogen, typically bromine, by refluxing within a suitably boiling organic solvent, particularly isopropanol, in the presence of an acid acceptor, particularly potassium carbonate. The reaction is advantageously carried out by using stoichiometric amounts of the reagents.

The compounds of the formula (III) may be prepared from the corresponding hydroxyl compounds by reaction with a thionyl halide within a solvent such as methylene chloride.

The compounds of this invention possess useful pharmacologic properties. They possess particularly hypolipemia inducing properties and also analgesic and anti-inflammatory properties. Moreover, the compounds have a low toxicity and may be used for therapeutic purposes. Thus, this invention includes also within its scope a therapeutic composition having particularly a hypolipemia-inducing activity, comprising a compound of the formula (I) or an acid addition salt thereof with therapeutically acceptable acids, together with a therapeutically acceptable carrier. The compounds may be used for oral, transcutaneous or rectal administration; or may also be used for topical applications on the skin and the mucous membranes.

The compounds may be formulated as solutions or suspensions for injection in ampoules or multiple-dosage vials, or as tablets, coated tablets, capsules, syrups, suppositories and ointments.

The daily dosage regimen for adults is comprised within a range from 5 mg to 500 mg, depending on the route of administration and on the desired effect. The pharmaceutically usable forms such as injectable solutions or suspensions, tablets or coated tablets, syrups, suppositories and ointments are prepared according to the methods usually employed in the pharmaceutical art.

The following examples are given to illustrate the invention without, however, limiting same.

EXAMPLE 1

1,2-bis-(4-m-Trifluoromethylphenyl-1-piperazinyl)-ethane

A heterogeneous mixture of 1-(m-trifluoromethylphenyl)-piperazine (23 g; 0.10 M), 1,2-dibromoethane (9.4 g; 0.05 M) and potassium carbonate (13.8 g; 0.1M) in isopropanol (100 ml) is refluxed during 16 hours. It is then concentrated to dryness, taken up into water and extracted with methylene chloride. The combined organic extracts are washed with water until neutral, dried over sodium sulfate and then concentrated to dryness. Recrystallization from isopropanol gives 13.4 g (55%) of white crystals, M.p. = 97°–98°C.

Analysis : $C_{24} H_{28} F_6 N_4 = 486.49$

|  | C% | H% | F% | N% |
|---|---|---|---|---|
| Calculated: | 59.25 | 5.80 | 23.43 | 11.52 |
| Found: | 59.10 | 5.84 | 23.51 | 11.43 |

EXAMPLE 2

Dimaleate of the compound of Example 1

The dimaleate is obtained by heating in ethanol a stoichiometric solution of 1,2-bis-(4-m-trifluoromethylphenyl-1-piperazinyl)-ethane and maleic acid. White crystals. M.p. = 228°–230°C.

Analysis : $C_{32} H_{36} F_6 N_4 O_8 = 718.64$

|  | C% | H% | F% | N% |
|---|---|---|---|---|
| Calculated: | 53.48 | 5.05 | 15.86 | 7.80 |
| Found: | 53.64 | 5.13 | 15.92 | 8.04 |

EXAMPLE 3

Difumarate of the Compound of Example 1

The difumarate is obtained by heating in ethanol a stoichiometric solution of 1,2-bis-(4-m-trifluoromethylphenyl-1-piperazinyl)-ethane and fumaric acid. White crystals. M.p. = 248°–250°C.

Analysis: $C_{32} H_{36} F_6 N_4 O_8 = 718.64$

|  | C% | H% | F% | N% |
|---|---|---|---|---|
| Calculated: | 53.48 | 5.05 | 15.86 | 7.80 |
| Found: | 53.59 | 5.11 | 15.92 | 7.94 |

EXAMPLE 4

1,2-bis-(4-o-Fluorophenyl-1-piperazinyl)-ethane

The same procedure is used as in Example 1. White crystals. M.p. = 136°C (ethanol).

Analysis: $C_{22}H_{28}F_2N_4 = 386.47$

|  | C% | H% | N% | F% |
| --- | --- | --- | --- | --- |
| Calculated: | 68.37 | 7.30 | 14.50 | 9.83 |
| Found: | 68.04 | 7.26 | 14.44 | 9.58 |

EXAMPLE 5

1,2-bis-(4-m-Fluorophenyl-1-piperazinyl)-ethane

The same procedure is used as in Example 1. White crystals. M.p. = 140°C (ethanol).

Analysis: $C_{22}H_{28}F_2N_4 = 386.47$

|  | C% | H% | N% | F% |
| --- | --- | --- | --- | --- |
| Calculated: | 68.37 | 7.30 | 14.50 | 9.83 |
| Found: | 68.46 | 7.30 | 14.52 | 9.56 |

EXAMPLE 6

1,2-bis-(4-p-Fluorophenyl-1-piperazinyl)-ethane

The same procedure is used as in Example 1. White crystals. M.p. = 171°C (isopropanol).

Analysis: $C_{22}H_{28}F_2N_4 = 386.47$

|  | C% | H% | N% | F% |
| --- | --- | --- | --- | --- |
| Calculated: | 68.37 | 7.30 | 14.50 | 9.83 |
| Found: | 68.09 | 7.23 | 14.44 | 9.50 |

EXAMPLE 7

1,2-bis-(4-m-Chlorophenyl-1-piperazinyl)-ethane

The same procedure is used as in Example 1. Beige crystals. M.p. = 138°C.

Analysis: $C_{22}H_{28}Cl_2N_4 = 419.38$

|  | C% | H% | Cl% | N% |
| --- | --- | --- | --- | --- |
| Calculated: | 63.00 | 6.73 | 16.91 | 13.36 |
| Found: | 62.64 | 6.93 | 16.99 | 12.96 |

EXAMPLE 8

1,2-bis-(4-o-tolyl-1-piperazinyl)-ethane

The same procedure is used as in Example 1. White crystals. M.p. = 98°C.

Analysis: $C_{24}H_{34}N_4 = 378.54$

|  | C% | H% | N% |
| --- | --- | --- | --- |
| Calculated: | 76.14 | 9.05 | 14.80 |
| Found: | 76.09 | 9.06 | 14.68 |

EXAMPLE 9

1,2-bis-(4-m-tolyl-1-piperazinyl)-ethane

The same procedure is used as in Example 1. White crystals. M.p. = 143°C.

Analysis: $C_{24}H_{34}N_4 = 378.54$

|  | C% | H% | N% |
| --- | --- | --- | --- |
| Calculated: | 76.14 | 9.05 | 14.80 |
| Found: | 76.28 | 9.10 | 14.76 |

EXAMPLE 10

1,2-bis-(4-p-Tolyl-1-piperazinyl)-ethane

The same procedure is used as in Example 1. White crystals. M.p. = 202°C.

Analysis: $C_{24}H_{34}N_4 = 378.54$

|  | C% | H% | N% |
| --- | --- | --- | --- |
| Calculated: | 76.14 | 9.05 | 14.80 |
| Found: | 76.22 | 9.10 | 15.00 |

EXAMPLE 11

1-(4-o-Fluorophenyl-1-piperazinyl)-2-(4-p-fluorophenyl-1-piperazinyl)-ethane

A heterogeneous mixture of 1-(2-chloro-ethyl)-4-(o-fluorophenyl)-piperazine (24.3 g; 0.1 M), (1-p-fluorophenyl)-piperazine (18 g; 0.1 M) and potassium carbonate (13.8 g; 0.1 M) in isopropanol (100 ml) is refluxed during 16 hours. It is then concentrated to dryness, taken up into water and extracted with methylene chloride. The resulting organic phase is washed with water until neutral, dried over sodium sulfate and concentrated to dryness, to give brown crystals which are recrystallized from ethyl acetate, to give 18.0 g (47%) of beige crystals, m.p. = 132°C.

Analysis: $C_{22}H_{28}F_2N_4 = 386.47$

|  | C% | H% | F% | N% |
| --- | --- | --- | --- | --- |
| Calculated: | 68.37 | 7.30 | 9.83 | 14.50 |
| Found: | 68.35 | 7.24 | 9.55 | 14.54 |

EXAMPLE 12

1-(4-o-Fluorophenyl-1-piperazinyl)-2-(4-m-chlorophenyl-1-piperazinyl)ethane

The same procedure is used as in Example 11. Beige crystals. M.p. = 112°C (ethyl acetate).

Analysis: $C_{22}H_{28}ClFN_4 = 402.93$

|  | C% | H% | Cl% | F% | N% |
| --- | --- | --- | --- | --- | --- |
| Calculated: | 65.57 | 7.00 | 8.81 | 4.72 | 13.91 |
| Found: | 65.47 | 7.00 | 8.91 | 4.72 | 13.75 |

EXAMPLE 13

1-(4-m-Trifluoromethylphenyl-1-piperazinyl)-2-(4-m-chlorophenyl-1-piperazinyl)-ethane The same procedure is used as in Example 11. Light yellow crystals. M.p. = 87°C (isopropanol).

Analysis: $C_{23}H_{28}ClF_3N_4 = 452.94$

|  | C% | H% | Cl% | F% | N% |
| --- | --- | --- | --- | --- | --- |
| Calculated: | 60.99 | 6.23 | 7.83 | 12.58 | 12.37 |
| Found: | 60.77 | 6.32 | 7.75 | 12.59 | 12.25 |

EXAMPLE 14

1-(4-m-Trifluoromethylphenyl-1-piperazinyl)-2-(4-o-tolyl-1-piperazinyl)-ethane

The same procedure is used as in Example 11. Pale yellow crystals. M.p. = 90°C (butanol-hexane 1:1).

Analysis: $C_{24} H_{31} F_3 N_4 = 432.52$

|  | C% | H% | F% | N% |
|---|---|---|---|---|
| Calculated: | 66.64 | 7.23 | 13.18 | 12.95 |
| Found: | 66.89 | 7.34 | 13.33 | 13.07 |

EXAMPLE 15

1-(4-m-trifluoromethylphenyl-1-piperazinyl)-2-(4-m-tolyl-1-piperazinyl)ethane

The same procedure is used as in Example 11. Light beige crystals. M.p. = 100°C (butanol).

Analysis: $C_{24} H_{31} F_3 N_4 = 432.52$

|  | C% | H% | F% | N% |
|---|---|---|---|---|
| Calculated: | 66.64 | 7.23 | 13.18 | 12.95 |
| Found: | 66.30 | 7.15 | 13.70 | 12.81 |

EXAMPLE 16

1-(4-m-Trifluoromethylphenyl-1-piperazinyl)-2-(4-p-tolyl-1-piperazinyl)-ethane

The same procedure is used as in Example 11. Beige crystals. M.p. = 131°C (benzene).

Analysis: $C_{24} H_{31} F_3 N_4 = 432.52$

|  | C% | H% | F% | N% |
|---|---|---|---|---|
| Calculated: | 66.64 | 7.23 | 13.18 | 12.95 |
| Found: | 66.95 | 7.22 | 13.38 | 12.66 |

EXAMPLE 17

1-(4-m-Trifluoromethylphenyl-1-piperazinyl)-2-(4-p-fluorophenyl-1-piperazinyl)-ethane The same procedure is used as in Example 11. Light yellow crystals. M.p. = 238°C (ethanol).

Analysis: $C_{31} H_{36} F_4 N_4 O_8 = 668.63$

|  | C% | H% | F% | N% |
|---|---|---|---|---|
| Calculated: | 55.68 | 5.43 | 11.37 | 8.38 |
| Found: | 55.47 | 5.31 | 11.64 | 8.64 |

EXAMPLE 18

The same procedure is used as in Example 11. White crystals. M.p. = 228°C (ethanol).

Analysis: $C_{31} H_{36} F_4 N_4 O_k = 668.63$

|  | C% | H% | F% | N% |
|---|---|---|---|---|
| Calculated: | 55.68 | 5.43 | 11.37 | 8.38 |
| Found: | 55.44 | 5.39 | 11.47 | 8.39 |

The results of toxicological and pharmacological tests which evidence the highly useful properties of the compounds of this invention are set forth below.

1. Acute toxicity determination

The acute toxicity tests were conducted with lots of 10 female "Swiss" strain mice weighing 19–21 g. The $LD_{50}$ by the oral route was determined according to KARBER and BEHRENS' method after 48 hours of observation.

All the compounds of this invention were found to have low toxicity. The results obtained are summarized in the Table given hereinafter.

2. Hypolipemia-inducing activity

Said hypolipemia-inducing activity was evidenced in adult normal rats after ingestion of each of the compounds during four consecutive days. The dosages used are relatively low.

The serum triglyceride and cholesterol levels were determined according to KESSLER and LEDERER's (Automation in Analytical Chemistry, ed., L. T. SKEGGS, New York 1965, 341) and J. LEVINE and B. ZAK's (Clin. Chim. Acta, 1964, 10, 381) semi-automatic technique.

Under the same conditions, the clofibrate ($LD_{50}$ = 1600 mg/kg by the oral route) at a dosage of 100 mg/kg decreases the triglycerides by a factor of 33% and the cholesterol by a factor of 10%.

The results obtained are summarized in the Table given hereinafter.

3. Analgesic activity

The analgesic activity was determined by the inhibition test on the peritoneal pain induced by injection of acetic acid in mice.

This test is based on the observation made by KOSTER and coworkers (Fed. Proc. 1959, 18, 412) according to which intraperitoneal injection of 0.2 ml/20 g of a 6 ‰ acetic acid solution induces in mice writhing and stretching motions. The compounds having an analgesic action attenuate or suppress this syndrome.

Lots of 10 mice were administered orally the various test compounds, 30 minutes prior to the challenging agent. The stretching motions were counted during 15 minutes and the analgesic effect was expressed as percent decrease of the number of stretching motions with respect to the control animals.

Under the same conditions, acetylsalicylic acid ($LD_{50}$ = about 1500 mg/kg by the oral route) at a dosage of 100 mg/kg by the oral route gave a percent protection of 50%.

The results obtained are summarized in the Table given hereinafter.

4. Anti-inflammatory activity

The anti-inflammatory activity was determined in rats by means of the carrhageenin induced oedema of the paw.

Rats weighing about 120 g are administered 0.1 ml of an 0.5% carrhageenin suspension (plantar sub-aponeurotic injection) 1 hour after oral treatment with the various compounds of this invention.

The volume of the rear paws is measured prior to injection of the inflammatory agent, and 2, 3 and 4 hours after said injection. The anti-inflammatory activity is expressed as percent protection with respect to the control animals.

Under the same conditions, indometacine ($LD_{50}$ = 50 mg/kg, by the oral route) at a dosage of 5 mg/kg affords 30% protection.

The results obtained are summarized in the Table given hereinafter.

| Compound of Example No. | LD$_{50}$ mg/kg p.o. | HYPOLIPEMIA-INDUCING ACTIVITY | | | | | ANALGESIC ACTIVITY | | | ANTI-INFLAMMATORY ACTIVITY | |
|---|---|---|---|---|---|---|---|---|---|---|---|
| | | Dosage mg/kg p.o. | Triglyc. | | Cholest- | | Dosage mg/kg p.o. | Protection | | Dosage mg/kg p.o. | Protection |
| 1  | 3200 | 5    | − 40   | % | − 52   | % | 40 | 50   | % | 40  | 38 % |
| 3  | 2910 | 7.5  | − 37   | % | − 62   | % | 60 | 68   | % | 60  | 25 % |
| 2  | 3200 | 7.5  | − 29   | % | − 50   | % | 60 | 73   | % | 120 | 51 % |
| 13 | 3200 | 10   | − 40   | % | − 48   | % | 40 | 59   | % | 40  | 30 % |
| 7  | 3200 | 10   | − 19   | % | − 49.5 | % | 80 | 53   | % | 80  | 32 % |
| 18 | 1200 | 7    | − 17.5 | % | − 34.5 | % | 55 | 68   | % | 110 | 14 % |
| 17 | 1200 | 7    | − 19   | % | − 50.5 | % | 14 | 65.5 | % | 55  | 22 % |
| 12 | 1460 | 10   | − 31   | % | − 29   | % | 73 | 64   | % | 146 | 26 % |
| 11 | 2400 | 10   | − 33   | % | − 47.5 | % | 15 | 58   | % | 240 | 50 % |
| 4  | 880  | 10   | − 40   | % | − 22.5 | % | 44 | 64   | % | 88  | 17 % |
| 5  | 3200 | 10   | − 22   | % | − 37   | % | 40 | 66   | % | 320 | 14 % |
| 6  | 2500 | 10   | − 35.5 | % | − 46.5 | % | 1  | 41   | % | 44  | 51 % |
| 8  | 3200 | 10   | + 5.5  | % | − 15   | % | 40 | 55   | % | 320 | 25 % |
| 9  | 2910 | 10   | − 3.5  | % | − 36   | % | 9  | 64   | % | 100 | 37 % |
| 10 | 3200 | 10   | − 28   | % | − 32.5 | % | 10 | 70   | % | 320 | 25 % |
| 14 | 2910 | 10   | − 25   | % | − 35   | % | 73 | 71   | % | 290 | 35 % |
| 15 | 1200 | 10   | − 25   | % | − 44   | % | 60 | 64   | % | 120 | 70 % |
| 16 | 3200 | 10   | − 12   | % | − 43.5 | % | 40 | 58   | % | 320 | 72 % |

I claim:

1. A compound of the formula:

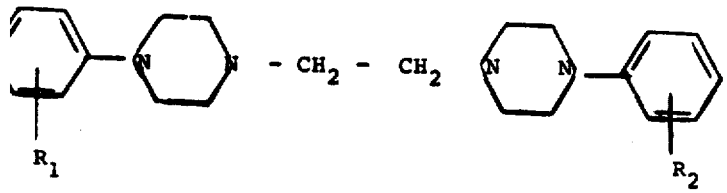

which $R_1$ and $R_2$ represent independently from each other a radical selected from the group consisting of chloro, fluoro, trifluoromethyl and methyl and their addition salts with therapeutically acceptable acids.

2. 1,2-Bis-(4-m-Trifluoromethylphenyl-1-piperazinyl)-ethane or its addition salts with therapeutically acceptable acids.

3. 1,2-Bis-(4-p-fluorophenyl-1-piperazinyl)-ethane or its addition salts with therapeutically acceptable acids.

4. 1,2-Bis-(4-m-chlorophenyl-1-piperazinyl)-ethane or its addition salts with therapeutically acceptable acids.

5. 1-(4-o-Fluorophenyl-1-piperazinyl)-2-(4-p-fluorophenyl-1-piperazinyl)-ethane or its addition salts with therapeutically acceptable acids.

6. 1-(4-m-Trifluoromethylphenyl-1-piperazinyl)-2-(4-m-chlorophenyl-1-piperazinyl)-ethane or its addition salts with therapeutically acceptable acids.

7. 1-(4-Trifluoromethylphenyl-1-piperazinyl)-2-(4-p-fluorophenyl-1-piperazinyl)-ethane or its addition salts with therapeutically acceptable acids.

* * * * *